(12) United States Patent
Adachi

(10) Patent No.: US 7,024,129 B2
(45) Date of Patent: Apr. 4, 2006

(54) AIR EXHAUST DEVICE HAVING RESILIENT MEMBER FOR REDUCING NOISE, AND IMAGE FORMING APPARATUS USING THE SAME AIR EXHAUST DEVICE

(75) Inventor: Takefumi Adachi, Kawaguchi (JP)

(73) Assignee: Ricoh Company, Ltd., Tokyo (JP)

(*) Notice: Subject to any disclaimer, the term of this patent is extended or adjusted under 35 U.S.C. 154(b) by 1046 days.

(21) Appl. No.: 09/791,797

(22) Filed: Feb. 26, 2001

(65) Prior Publication Data

US 2001/0033393 A1 Oct. 25, 2001

(30) Foreign Application Priority Data

Feb. 24, 2000 (JP) .................................. 2000-048058
Jan. 31, 2001 (JP) .................................. 2001-023259

(51) Int. Cl.
G03G 21/20 (2006.01)

(52) U.S. Cl. ........................................................ 399/92
(58) Field of Classification Search ................ 399/92, 399/91, 107; 110/162; 392/360
See application file for complete search history.

(56) References Cited

U.S. PATENT DOCUMENTS

| | | | | |
|---|---|---|---|---|
| 3,589,268 A | * | 6/1971 | Steiner | 454/350 |
| 5,612,768 A | * | 3/1997 | Kim et al. | 399/92 |
| 6,173,132 B1 | * | 1/2001 | Kida et al. | 399/44 |
| 6,215,659 B1 | * | 4/2001 | Chen | 361/695 |
| 6,343,011 B1 | * | 1/2002 | Yu | 361/695 |
| 6,526,237 B1 | * | 2/2003 | Endo | 399/49 |
| 6,779,975 B1 | * | 8/2004 | Takashima et al. | 415/213.1 |
| 6,792,226 B1 | * | 9/2004 | Chikano | 399/92 |

FOREIGN PATENT DOCUMENTS

| | | |
|---|---|---|
| JP | 3-105850 | 11/1991 |
| JP | 4-024662 | 1/1992 |
| JP | 5-67083 | 9/1993 |
| JP | 5-96459 | 12/1993 |
| JP | 6-015870 | 1/1994 |
| JP | 7-92862 | 4/1995 |
| JP | 7-197639 | 8/1995 |
| JP | 11-132199 | 5/1999 |
| JP | 11-194760 | 7/1999 |
| JP | 2000-022375 | 1/2000 |
| JP | 2000-55015 | 2/2000 |

OTHER PUBLICATIONS

U.S. Appl. No. 09/791,797, filed Feb. 26, 2001, Adachi.
U.S. Appl. No. 10/943,960, filed Sep. 20, 2004, Imamura et al.
U.S. Appl. No. 10/743,865, filed Dec. 24, 2003, Matsumoto et al.

\* cited by examiner

*Primary Examiner*—Christopher W. Fulton
(74) *Attorney, Agent, or Firm*—Oblon, Spivak, McClelland, Maier & Neustadt, P.C.

(57) ABSTRACT

An air exhaust device for use in an image forming apparatus includes a duct and a fan unit arranged in the duct. The duct includes a resilient holding member configured to resiliently hold the fan unit. The air exhaust device is arranged in a main body of the image forming apparatus.

43 Claims, 12 Drawing Sheets

AIR EXHAUST DEVICE HAVING RESILIENT MEMBER FOR REDUCING NOISE, AND IMAGE FORMING APPARATUS USING THE SAME AIR EXHAUST DEVICE

BACKGROUND OF THE INVENTION

1. Field of the Invention

The present invention relates to an image forming apparatus such as a copying machine, a printer, a facsimile, etc. or a multi-functional image forming apparatus, and more particularly to an air exhaust device arranged in a main body of the image forming apparatus to exhaust air in a part of the image forming apparatus so as to discharge heat, ozone, etc. from the main body of the image forming apparatus.

2. Discussion of the Background

In a background image forming apparatus, heat and ozone generated in a main body of the image forming apparatus are discharged from the main body thereof by use of an air exhaust fan. The air exhaust fan is attached to a structural assembly of the main body of the image forming apparatus by screws via rubber parts.

In such the background image forming apparatus, the vibration of the air exhaust fan is transmitted to the structural assembly of the main body of the image forming apparatus, and thereby annoying noise is produced.

Recently, a standard for an allowable level of noise is set, such as, for example, an eco-mark in Japan, and a Blue Angel Mark (BAM) in Europe. There is an increasing demand for an image forming apparatus that can be kept quiet both in the stand-by and operation.

Moreover, in the background image forming apparatus, because the air exhaust fan is attached to the structural assembly of the main body of the image forming apparatus by screws via rubber parts, the number of parts such as screws and rubber parts increases, so that the cost of the image forming apparatus increases. In addition, due to the necessity of the parts, the air exhaust fan is not easily attached to the structural assembly of the main body of the image forming apparatus.

SUMMARY OF THE INVENTION

The present invention has been made in view of the above-discussed and other problems, and an object of the present invention is to provide a novel air exhaust device in which a noise can be reduced, and which can be easily attached to an image forming apparatus with a smaller number of parts.

These and other objects are achieved according to the present invention by providing a novel air exhaust device for use in an image forming apparatus, including a duct, and a fan unit arranged in the duct. The duct includes a resilient holding member configured to resiliently hold the fan unit.

The air exhaust device may be arranged in a main body of the image forming apparatus.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Preferred embodiments of the present invention are described in detail referring to the drawings, wherein like reference numerals designate identical or corresponding parts throughout the several views.

Figure 1:
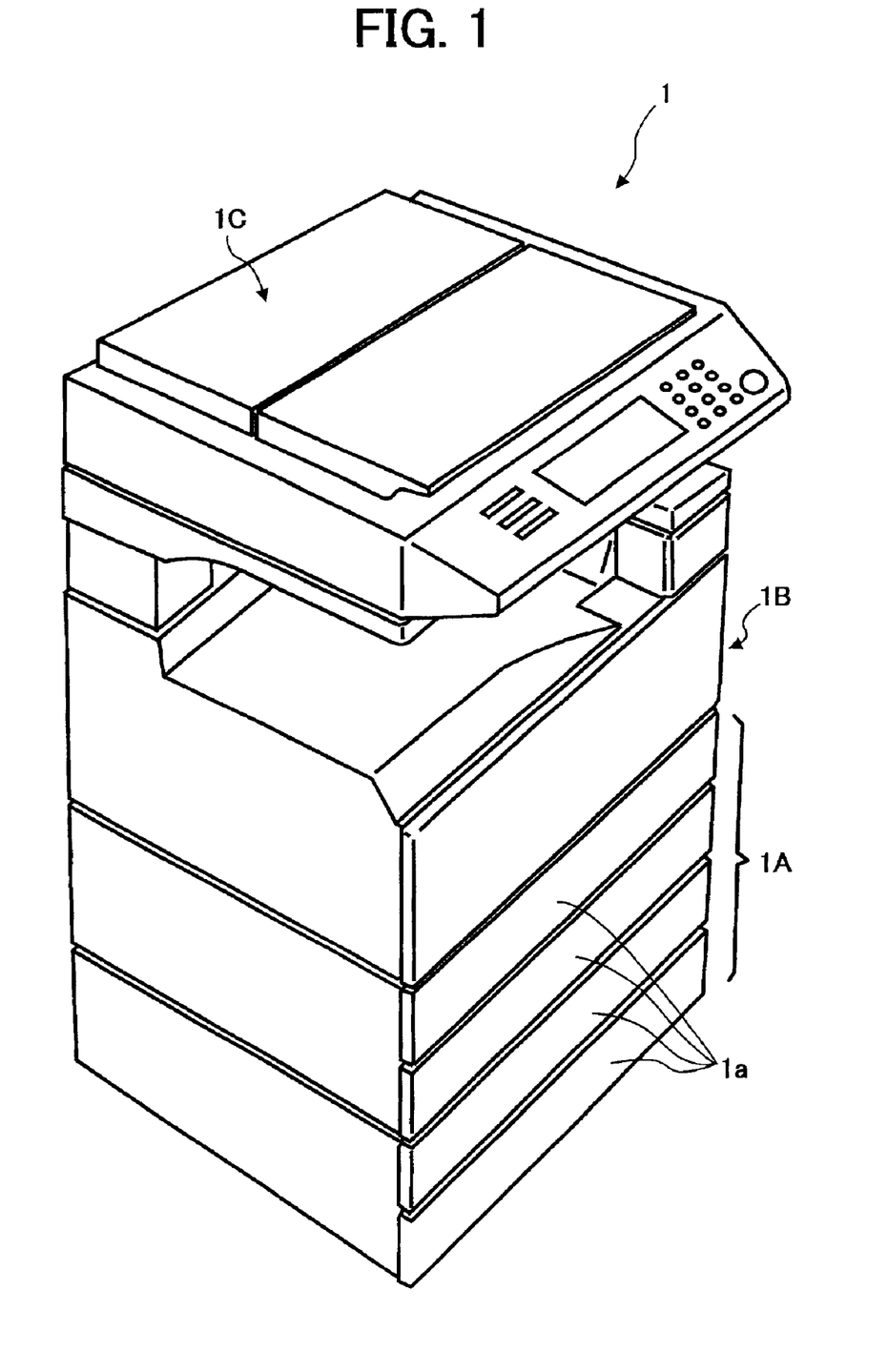
FIG. 1 is an external perspective view illustrating a copying machine as an image forming apparatus according to an embodiment of the present invention.

FIG. 1 is an external perspective view illustrating a copying machine 1 as an image forming apparatus. The copying machine 1 includes a sheet feeding table 1A constructed of two pairs of cassettes 1a, a main body 1B, and an image reading device 1C provided above the main body 1B.

Figure 2:
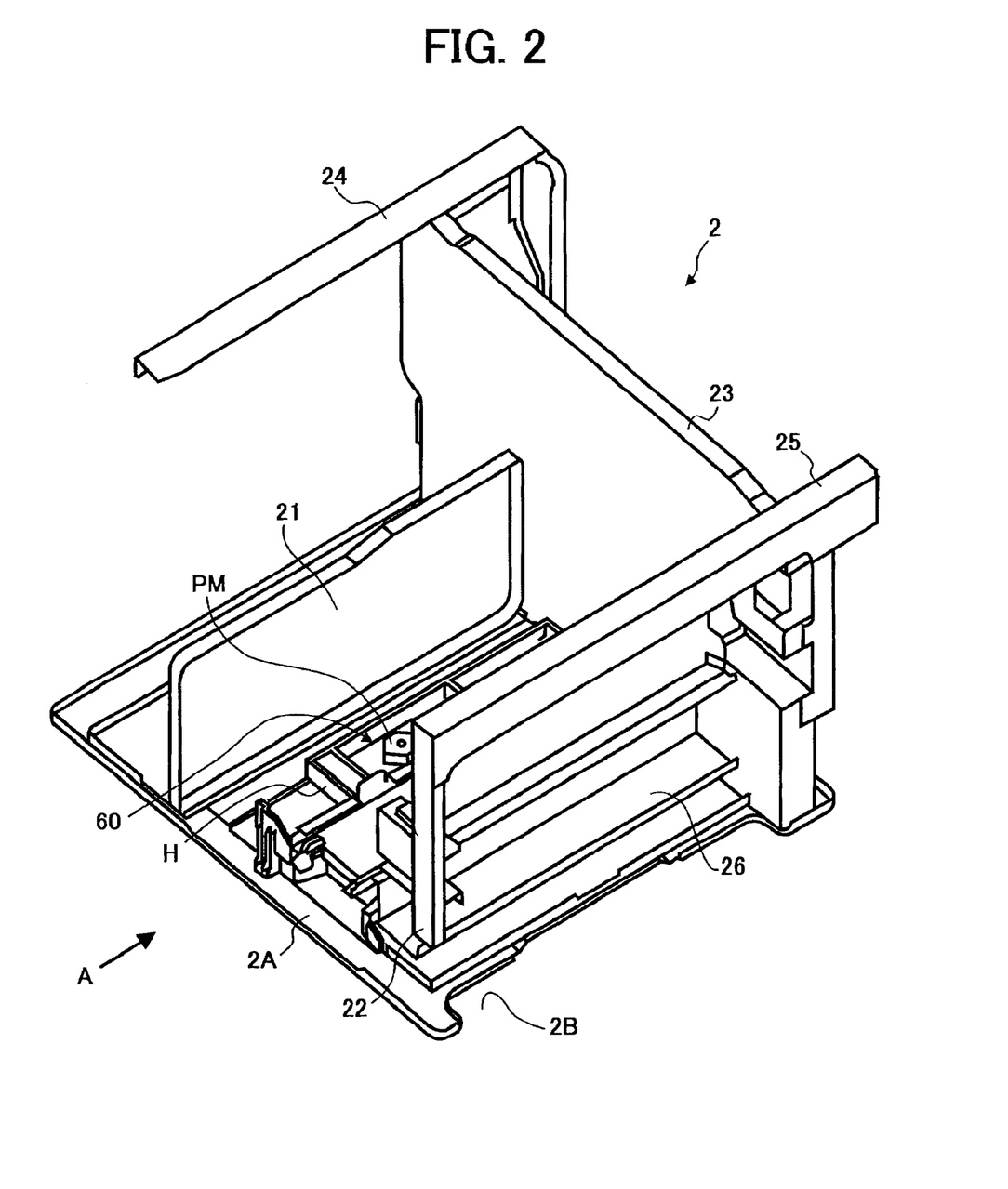
FIG. 2 is a perspective view illustrating a structural assembly of a main body of the copying machine.

FIG. 2 is a perspective view illustrating a structural assembly 2 provided in the main body 1B of the copying machine 1. Referring to FIG. 2, a direction from the front to the rear of the structural assembly 2 is indicated by arrow A.

The structural assembly 2 includes a front side plate (not shown) standing at the front side, a left stay 21 made of sheet metal standing at the left side as seen from the front side in FIG. 2, an arm 22 standing at the right front side as seen from the front side in FIG. 2, and a rear side plate 23 standing at the rear side. The above-described front side plate, the left stay 21, the arm 22, and the rear side plate 23 stand on a bottom plate 2A.

The structural assembly 2 further includes a left arm 24 supported by the rear side plate 23 and extends toward the front at the left upper side part of the structural assembly 2. Moreover, at the right side part of the structural assembly 2, the structural assembly 2 includes a right arm 25 that extends between the arm 22 and the rear side plate 23, and a stay 26 made of sheet metal and has a U-shaped cross section. The right arm 25 is situated on the stay 26.

In the above-described structural assembly 2, a drum-shaped image bearing member (not shown) is provided in the stay 26. Around the image bearing member, there are arranged a charging device, an image writing device, a developing device, a transfer device, a cleaning device, etc. (all of which are not shown). Toner images are formed on a transfer material, for example, a transfer sheet, by the following process steps: charging the image bearing member uniformly by the charging device, electrostatically forming a latent image on the image bearing member by the image writing device, developing the latent image with a toner by the developing device, transferring the toner image to a transfer material by the transfer device, and removing a residual toner on the image bearing member, by the cleaning device, that remains on the surface of the image bearing member after the toner image is transferred to the transfer material. The transfer material is conveyed upward through a cutaway portion 2B of the bottom plate 2A.

As illustrated in FIG. 2, an image writing device 60 that forms an electrostatic latent image on the image bearing member is provided on the bottom plate 2A of the structural assembly 2. The image writing device 60 includes a scanning optical system having a light source (not shown) such as a laser diode, a polygon mirror PM for scanning, a polygon motor (not shown) that drives the polygon mirror PM to rotate, an fθ lens (not shown), etc, all of which are accommodated in a housing H.

Figure 3:
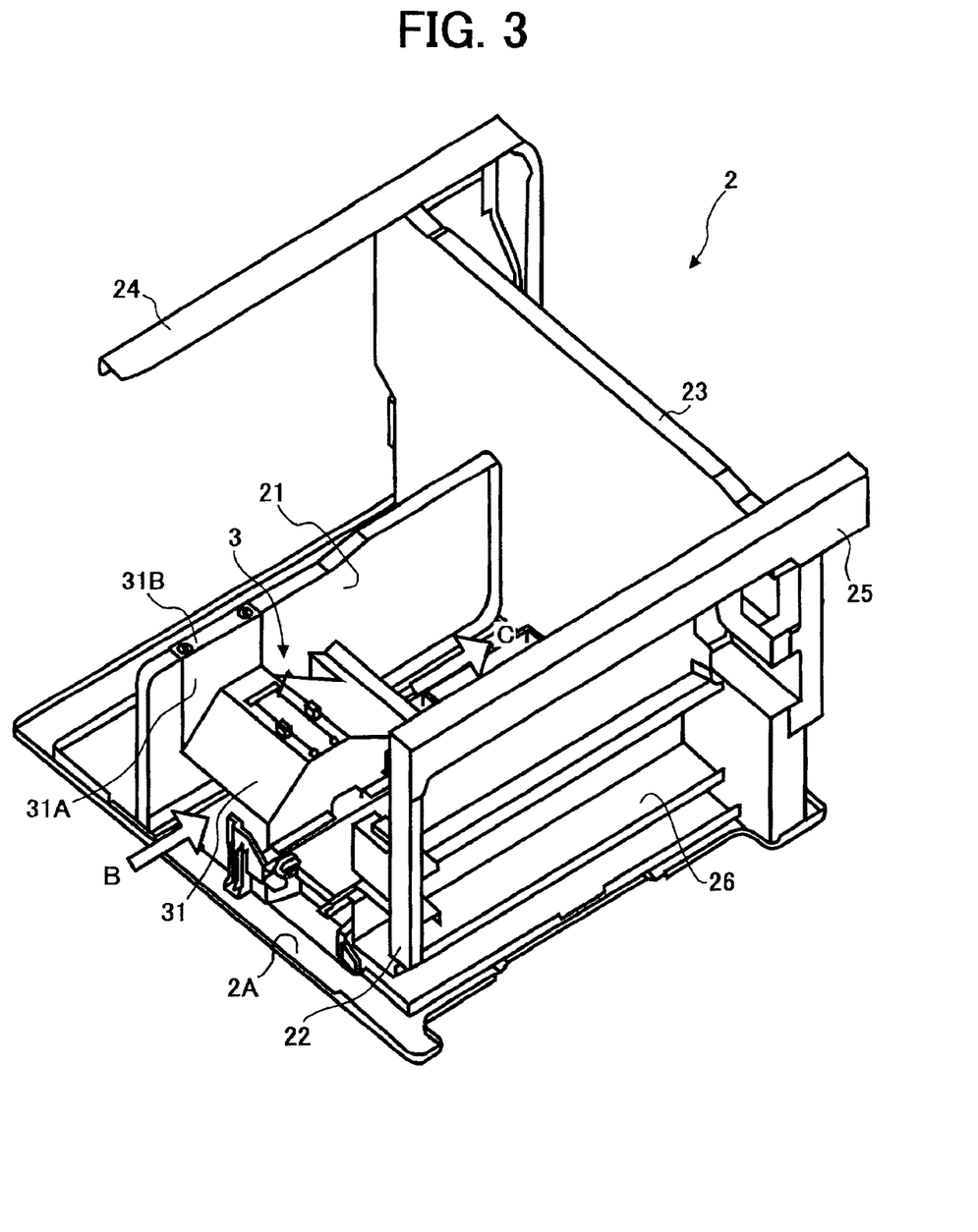
FIG. 3 is a perspective view illustrating the structural assembly of the main body of the copying machine to which an air exhaust device of the present invention is attached.
Figure 4A:
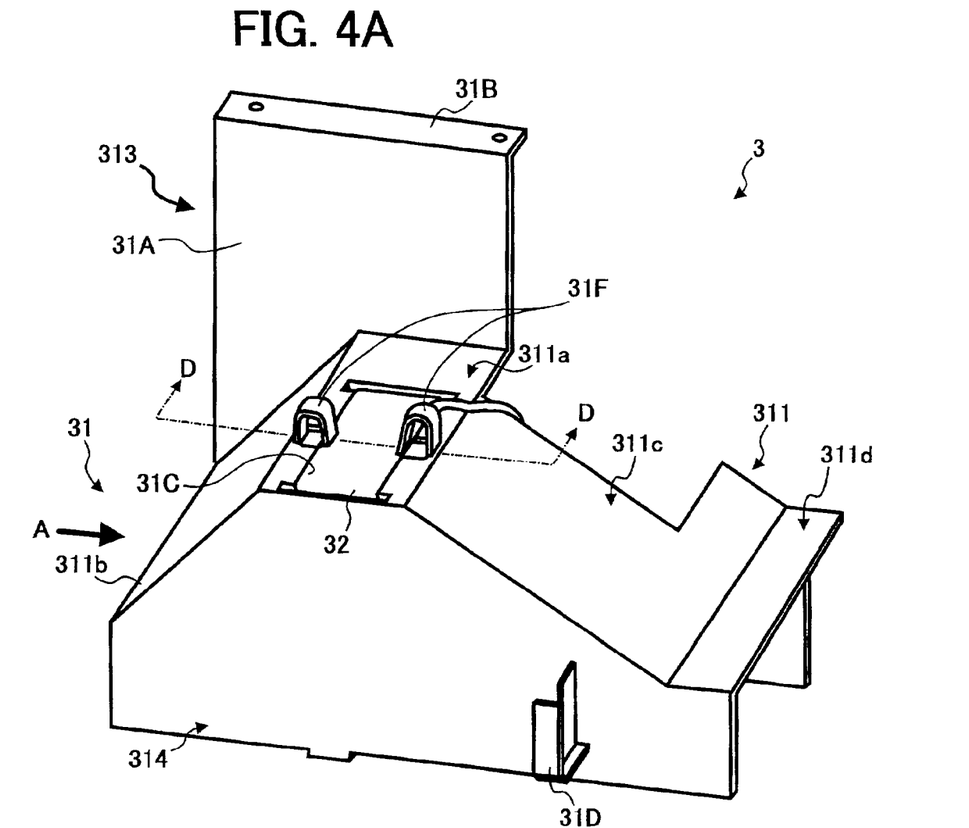
FIG. 4A is a perspective view illustrating the air exhaust device according to the embodiment of the present invention.
Figure 4B:
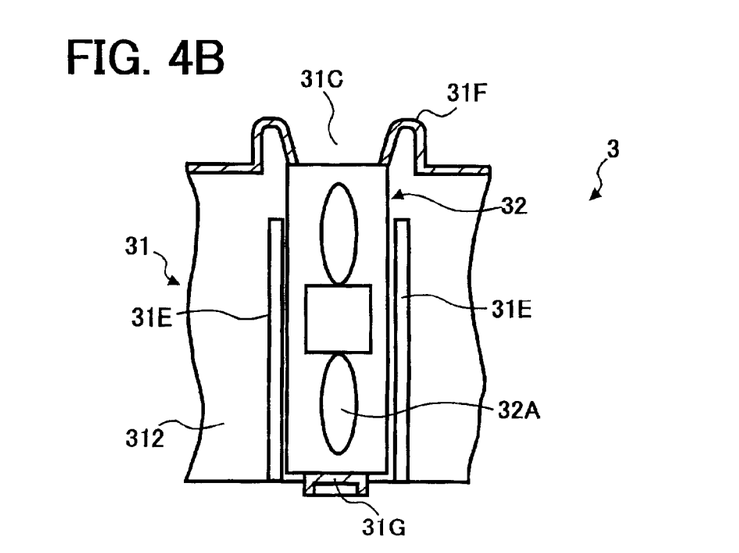
FIG. 4B is a cross-sectional view taken on line D—D of FIG. 4A.

As illustrated in FIG. 3, an air exhaust device 3 is provided above the image writing device 60. As illustrated in FIGS. 4A and 4B, the air exhaust device 3 includes a duct 31, and a fan unit 32 arranged in the duct 31.

In FIG. 4A, a direction of from the front to the rear is also indicated by arrow A. Referring to FIG. 4A, the duct 31 is integrally molded from resin material. The duct 31 is formed in a shape of a mountain having a top part 311, a left side surface part 312 (illustrated in FIG. 6), an attaching part 313, and a right side surface part 314.

The top part 311 includes a top surface 311a, a front slope 311b, a rear slope 311c, and a short flat skirt portion 311d that extends from the rear slope 311c toward the rear. An insert opening 31C of a rectangular shape is formed in the top surface 311a. A pair of upper resilient holding parts 31F having a reversed U-like configuration are provided on the top surface 311 a such that the pair of upper resilient holding parts 31F face each other across the insert opening 31C in the front and rear direction.

On each of the inner surfaces of the left and right side surface parts 312 and 314 are provided a pair of parallel guide ribs 31E, such that the pair of guide ribs 31E on the inner surface of the left side surface part 312 is opposite the pair of guide ribs 31E on the inner surface of the right side surface part 314.

The attaching part 313 includes a stand-up portion 31A that rises from left side end faces of the top surface 311a and the front slope 311b, and a bent portion 31B that is formed by bending the tip portion of the stand-up portion 31A at an approximately right angle.

The bottom of the right side surface part 314 is formed with a lower resilient holding part 31G that is bent inwardly at an approximately right angle from the bottom of the right side surface part 314 and is situated below the insert opening 31C. Moreover, the right side surface part 314 is formed with a resilient fixing part 31D in substantially a U-shape having a resilient tip portion. The resilient fixing part 31D stands on the outer surface of the right side surface part 314.

Figure 5:
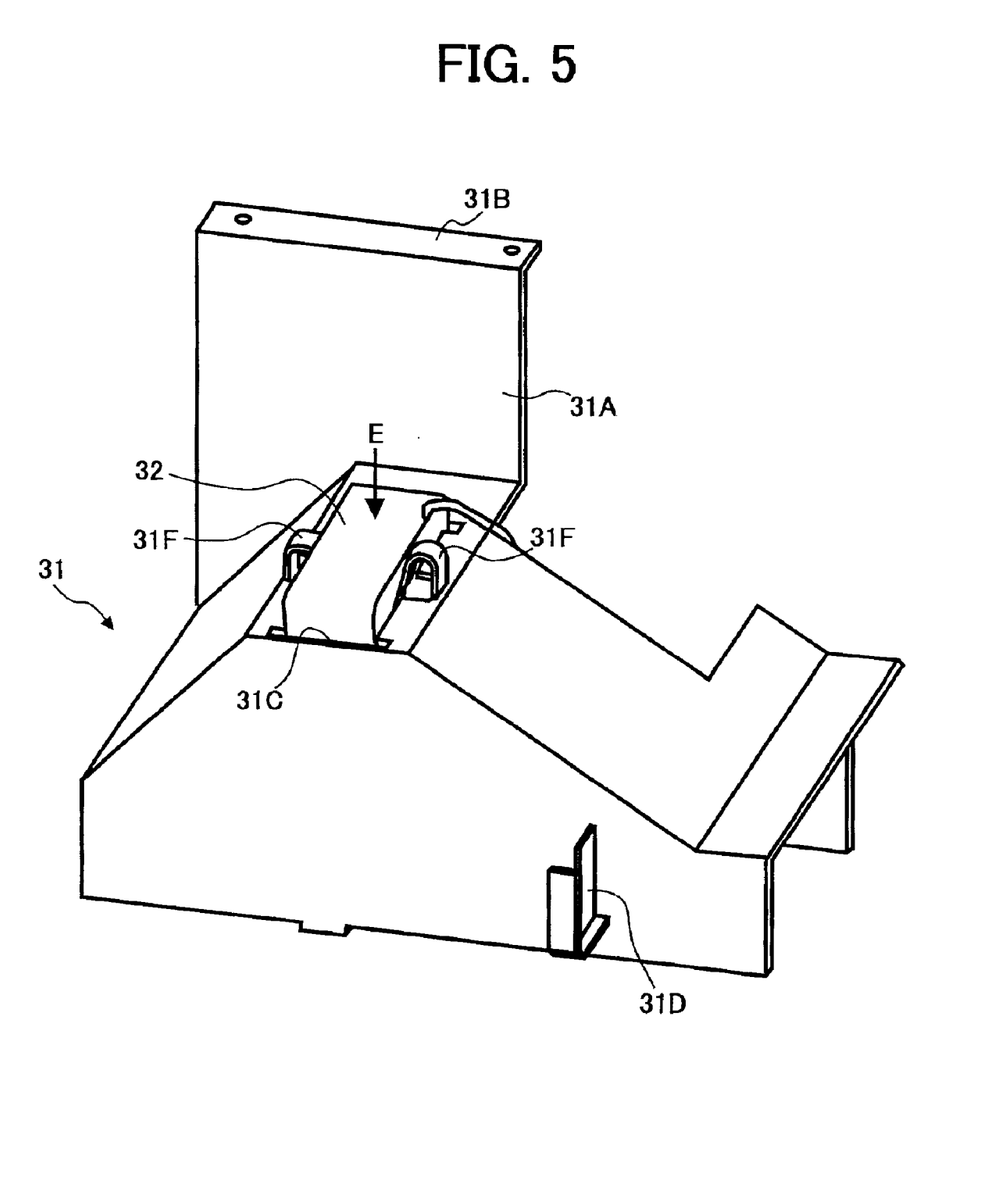
FIG. 5 is a perspective view for explaining a condition when a fan unit is inserted into a duct of the air exhaust device of the present invention.

As illustrated in FIG. 4B, the fan unit 32 includes an air exhaust fan 32A in a square frame of the fan unit 32. As illustrated in FIG. 5, the fan unit 32 is inserted into the duct 31 in a direction indicated by arrow E. Specifically, after pushing the pair of upper resilient holding part 31F outward, the fan unit 32 is inserted into the insert opening 31C and guided by the guide ribs 31E. Then, the fan unit 32 moves down to the lower resilient holding part 31G.

Figure 6:
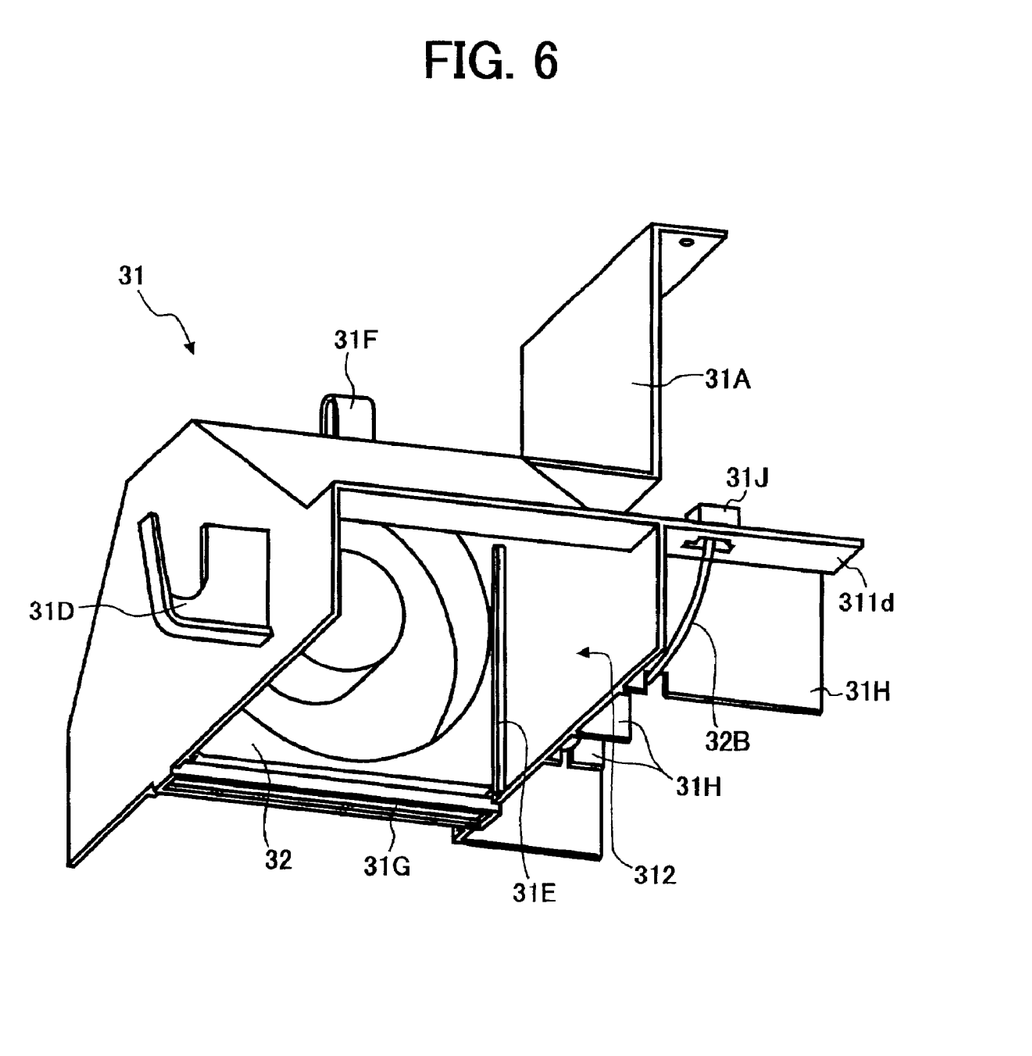
FIG. 6 is a schematic perspective view illustrating the air exhaust device viewed from the bottom.
Figure 7:
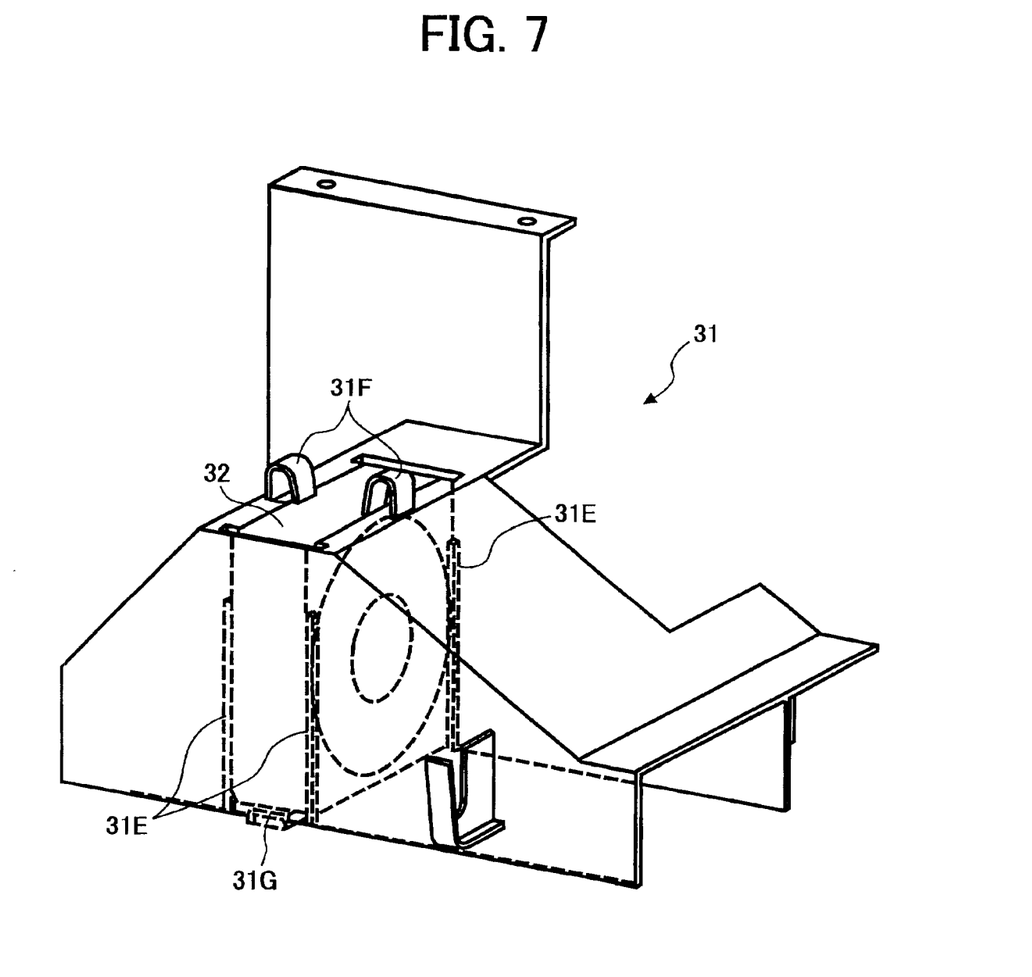
FIG. 7 is a transparency view illustrating the air exhaust device of the present invention.

After the fan unit 32 passes between the pair of upper resilient holding parts 31F, the upper resilient holding parts 31F are restored to their original shape. As a result, the upper resilient holding parts 31F hold the fan unit 32 from the top. As illustrated in FIG. 4B, FIGS. 6 and 7, the upper resilient holding parts 31F and the lower resilient holding part 31G resiliently hold the fan unit 32 sandwiched therebetween.

Figure 8A:
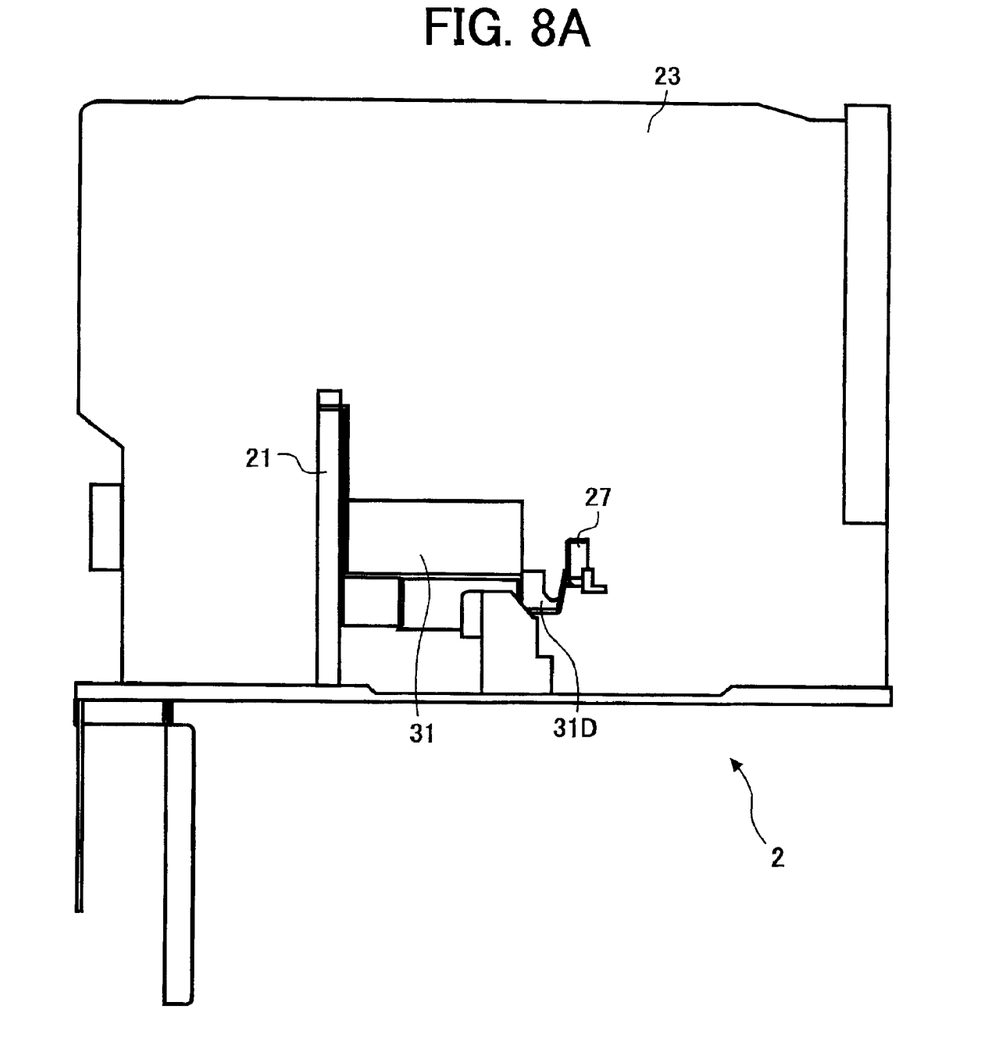
FIG. 8A is a front view illustrating the air exhaust device attached to the structural assembly of the main body of the copying machine.
Figure 8B:
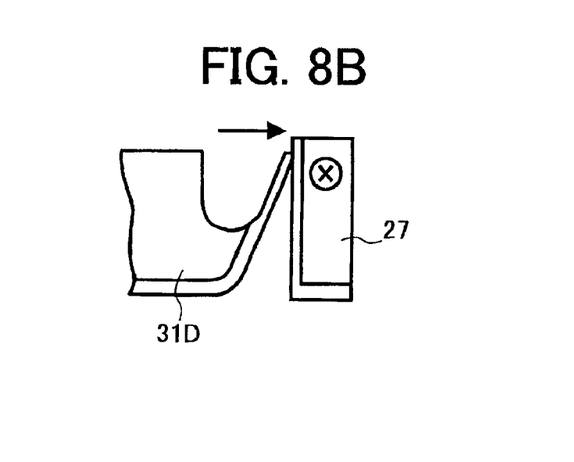
FIG. 8B is a partial enlarged view illustrating a resilient fixing part of the air exhaust device of the present invention.

As illustrated in FIG. 3, the above-described air exhaust device 3 is attached to the left stay 21 such that the bent portion 31B of the attaching part 313 is put on the top surface of the left stay 21 and fixed by screw. Moreover, as illustrated in FIGS. 8A and 8B, the duct 31 of the air exhaust device 3 is positioned and fixed in the main body 1B of the copying machine 1 with the tip portion of the resilient fixing part 31D resiliently pressed against a bracket 27 in the structural assembly 2 of the main body 1B.

With the above-described attachment of the air exhaust device 3 to the structural assembly 2, the duct 31 is supported by the structural assembly 2 such that the duct 31 hangs in the structural assembly 2. Owing to the above-described arrangement of the air exhaust device 3 in the main body 1B of the copying machine 1, transmission of the vibrations of the air exhaust fan 32A to the structural assembly 2 via the duct 31 can be avoided.

In the air exhaust device 3 illustrated in FIG. 3, when the fan unit 32 is driven, air is sucked from the front side as illustrated by arrow B through an opening of the front side plate (not shown) of the structural assembly 2. Then, the air is made to flow downward by the rear slope 311c. Subsequently, the air is exhausted from the short skirt portion 311d as illustrated by arrow C. By blowing air to the image writing device 60, the heat generated by the polygon motor is removed therefrom. The air exhausted from the short skirt portion 311d is further sucked and exhausted from the main body 1B of the copying machine 1 by a main air exhaust fan (not shown) separately provided in the main body 1B.

Figure 9:
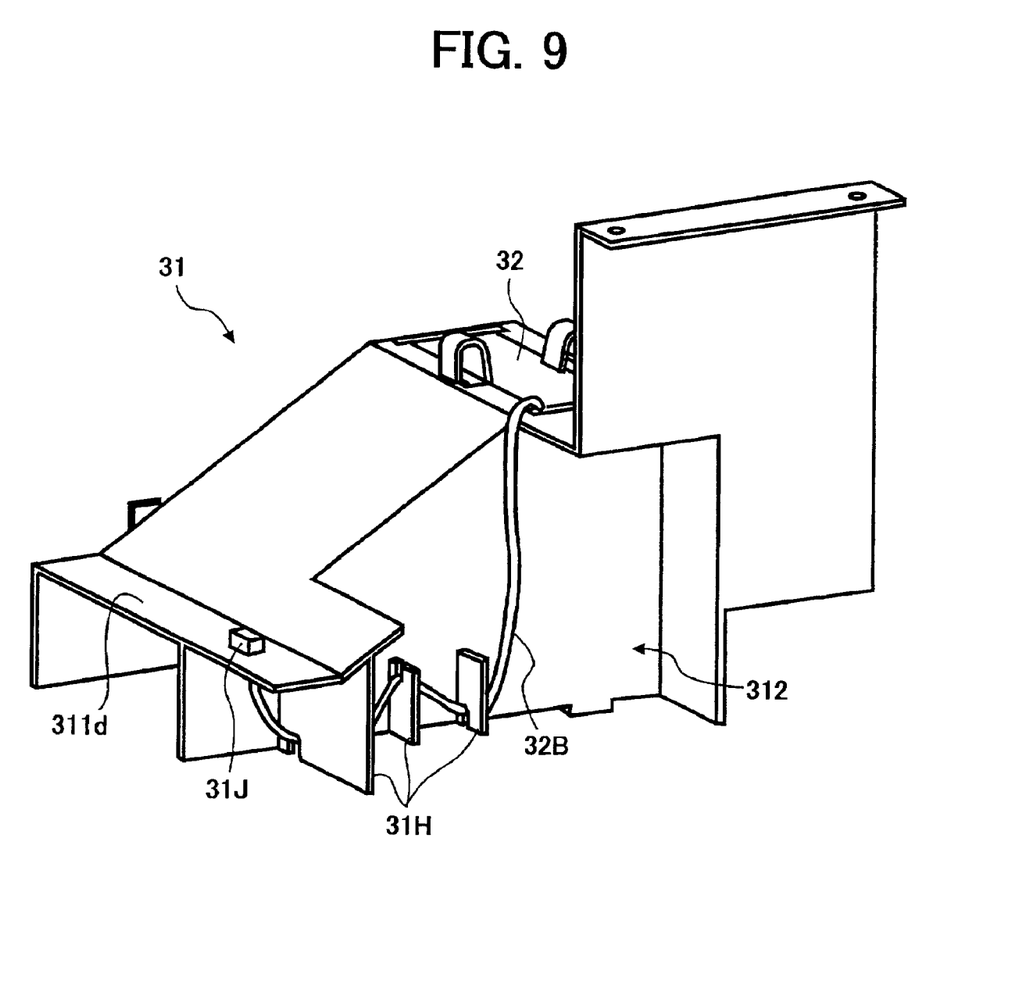
FIG. 9 is a perspective view illustrating the air exhaust device on which a harness is hooked.

As illustrated in FIGS. 6 and 9, a plurality of hooking plates 31H are provided on the outer surface of the left side surface part 312 of the duct 31 in a standing manner. On each of cut away grooves of the hooking plates 31H, a harness 32B connected to a drive motor (not shown) of the air exhaust fan 32A of the fan unit 32 is hooked. A connector 31J is attached to a tip end of the harness 32B. Although the illustration of the connector 31J is omitted in FIGS. 3, 4, 5, and 7, the connector 31J is held on the short skirt portion 311d of the duct 31.

As described above, the fan unit 32 is arranged in the duct 31 of the air exhaust device 3, and the air exhaust device 3 is arranged in the main body 1B of the copying machine 1. That is, the fan unit 32 is covered by the duct 31 and by an outer housing of the main body 1B of the copying machine 1. This configuration excludes the noise caused by the air exhaust fan 32A. If a legal standard for an allowable level of noise is set, an image forming apparatus including an air exhaust device with the above-described configuration can meet the standard.

Further, because the fan unit 32 is resiliently held by the upper resilient holding parts 31F and the lower resilient holding part 31G in the duct 31, transmission of the vibrations of the air exhaust fan 32A to the structural assembly 2 of the main body 1B of the copying machine 1 can be prevented, so that the noise caused by the air exhaust fan 32A can be reduced. Moreover, owing to the upper resilient holding parts 31F and the lower resilient holding part 31G, the fan unit 32 can be easily attached to the duct 31 without using rubber parts. As a result, the cost of the copying machine 1 can be decreased.

In the above-described air exhaust device 3, because the duct 31 includes the resilient fixing part 31D configured so as to be pressed against the bracket 27 to position and fix the duct 31 in the main body 1B of the copying machine 1, the air exhaust device 3 can be easily attached to the main body 1B of the copying machine 1 with a fewer number of parts such as screws. It also allows the cost of the copying machine 1 to be lowered.

Further, because the duct 31, the upper resilient holding parts 31F, the lower resilient holding part 31G, the resilient fixing part 31D, and the attaching part 313 are integrally molded from resin material, the noise caused by the vibration of the air exhaust fan 32A can be reduced, and the attachments of the fan unit 32 and the duct 31 can be easily performed. In addition, owing to the above-described integral molding, the number of parts necessary for the attachments of the fan unit 32 and the duct 31 can be decreased. Consequently, the cost of the copying machine 1 can be decreased.

Moreover, in the above-described air exhaust device 3, because the duct 31 is attached to the structural assembly 2 of the main body 1B of the copying machine 1, the air exhaust fan 32A is securely fixed in the main body 1B via the duct 31. Owing to the secure fixation of the air exhaust fan 32A, the generation of noise can be further avoided.

As described above, the connector 31J attached to the one end of the harness 32B of the air exhaust fan 32A is held by the duct 31. Because the air exhaust device 3 is unitized with the harness 32B, it can be convenient to exchange or take out the air exhaust fan 32A at a time of trouble or inspection. In addition, the connector 31J can be easily connected or disconnected from the outside.

In the above-described duct 31, the fan unit 32 is resiliently held between the upper resilient holding parts 31F and the lower resilient holding part 31G. Alternatively, referring to a duct 41 illustrated in FIG. 10, the fan unit 32 may be resiliently held between right and left resilient holding parts 41A which are cut and raised inwardly from the right and left side surface parts 414 and 412, respectively.

Figure 10:
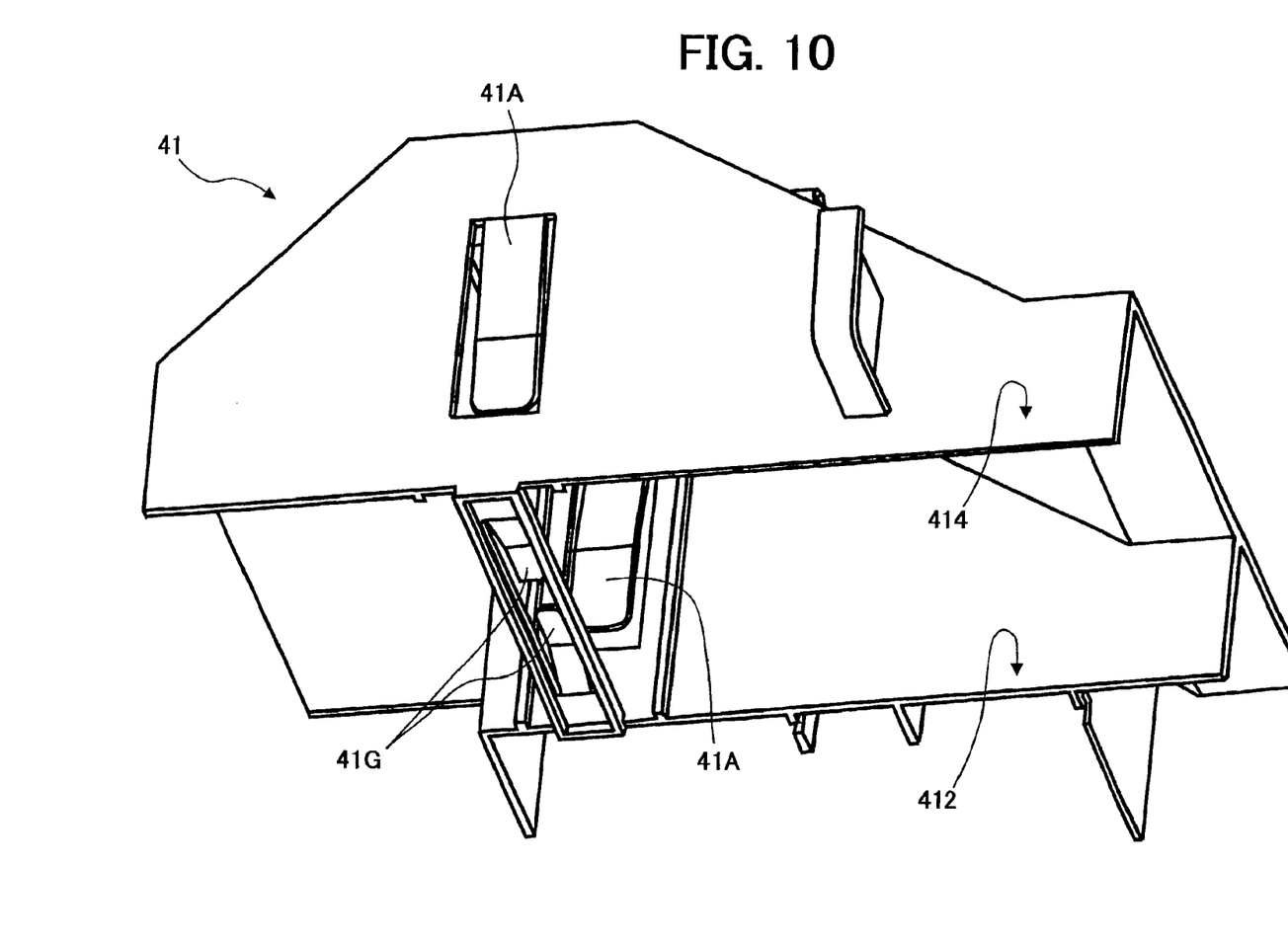
FIG. 10 is a perspective view illustrating an air exhaust device according to an alternative example.

Further, the fan unit 32 may be arranged in the duct 41 such that the fan unit 32 is resiliently held by upper and lower resilient holding parts and the right and left resilient holding parts 41A. FIG. 10 illustrates lower resilient holding parts 41G formed similarly as in the lower resilient holding part 31G of the duct 31.

The shapes of the resilient holding parts are not limited to those of the upper resilient holding parts 31F and of the lower resilient holding parts 31G and 41G, but any shapes which can resiliently hold the fan unit 32 in the duct 31 or the duct 41 can be employed.

Likewise, the shape of the resilient fixing part 31D is not limited to the above-described shape, but any shapes of the resilient fixing part can be employed, so long as the ducts 31 or 41 can be positioned and fixed in the main body 1b of the copying machine 1 with the resilient fixing part pressed against a member such as the bracket 27 of the main body 1b of the copying machine 1.

Figure 11:
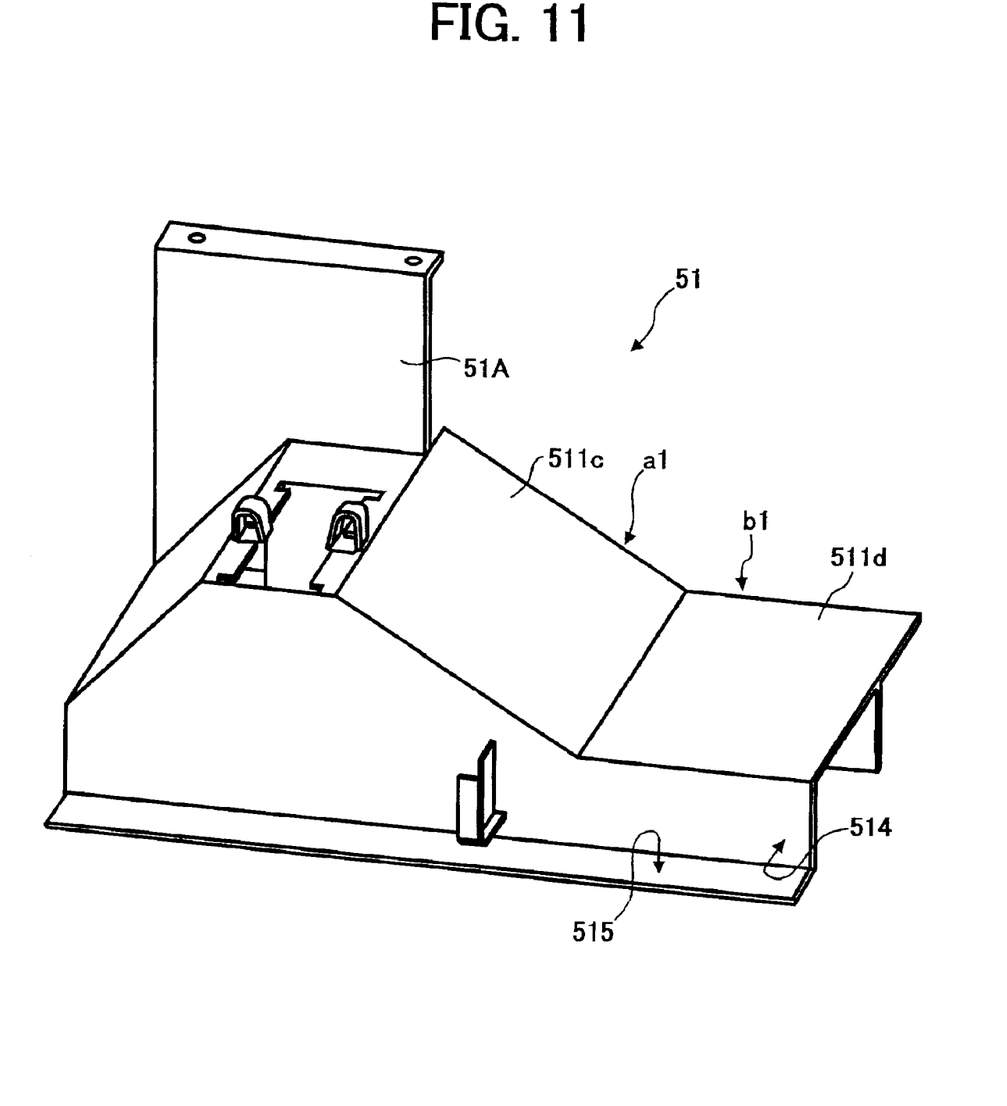
FIG. 11 is a perspective view illustrating an air exhaust device according to another alternative example.
Figure 12:
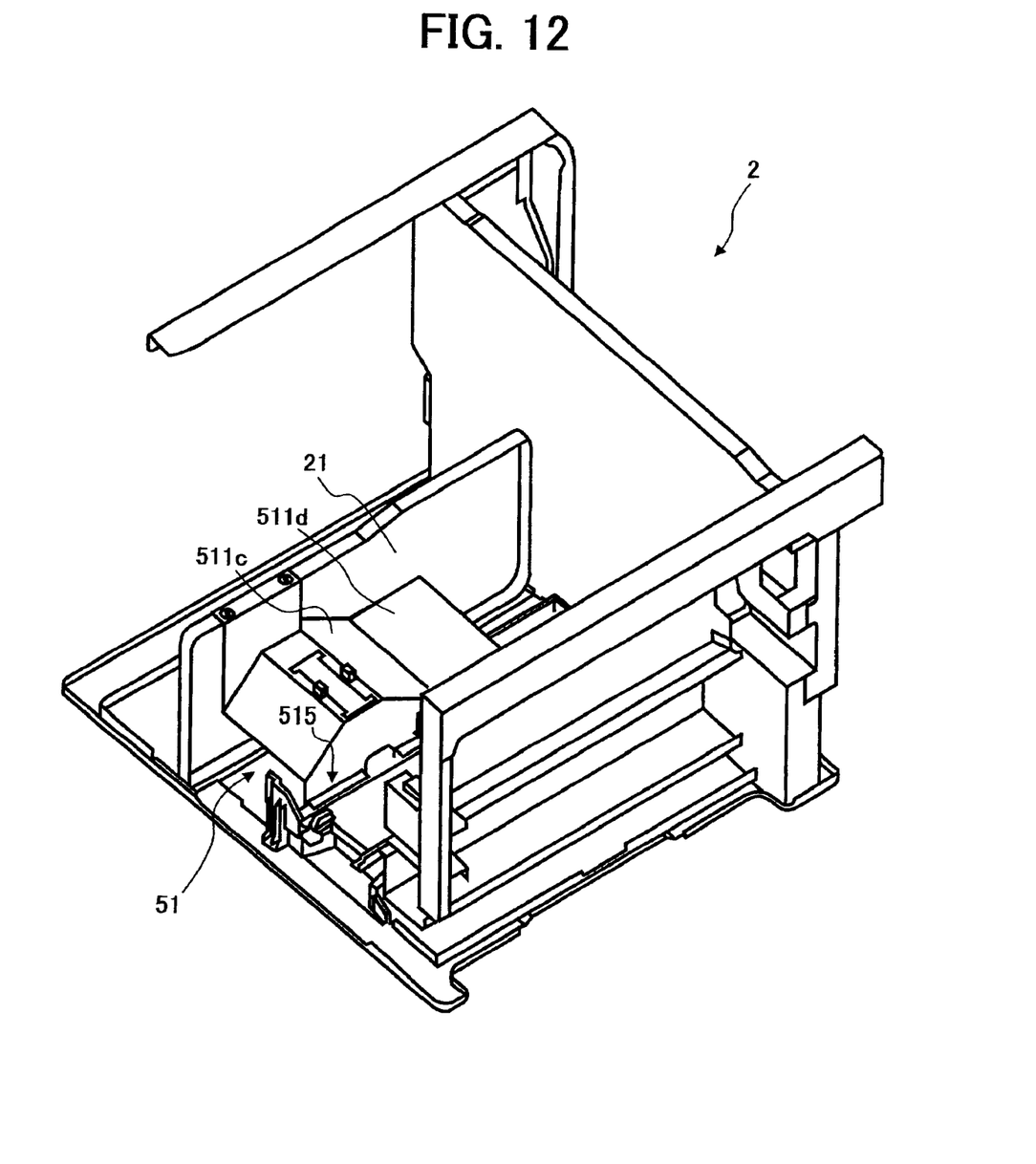
FIG. 12 is a schematic perspective view illustrating the structural assembly of the main body of the copying machine to which the air exhaust device of FIG. 11 is attached.

As an alternative to the above-described ducts 31 and 41, a duct 51 illustrated in FIGS. 11 and 12 may be employed. Like the ducts 31 and 41, the duct 51 holds a fan unit having an air exhaust fan. In addition, as illustrated in FIG. 11, the duct 51 includes a first flat skirt portion 511d that extends from a slope 511c to the right-hand side as viewed in FIG. 11, and a second skirt portion 515 bent outwardly at an approximately right angle from a side surface part 514.

As compared with the duct 31 of FIGS. 4A and 4B, which is mainly formed for the purpose of exhausting air to remove heat and ozone generated from the image writing device 60, the duct 51 is configured with a larger size and the surface area. Owing to the above-described configuration of the duct 51, the noise that propagates from the polygon motor is confined within the duct 51.

Generally, a polygon motor is configured such that as the density of image forming pixels becomes high, a rotation number of the polygon motor increases accordingly. When the polygon motor rotates at a high speed, Joule heat may be generated from a coil part of the polygon motor due to friction. As a result, the temperature of the polygon motor may far exceed a proper value.

In the copying machine 1 according to the embodiment of the present invention, the polygon motor is similarly configured to rotate at a high speed. Therefore, an air exhaust fan in the duct 51 effectively serves to reduce the temperature at the image writing device 60.

Referring to FIG. 11, the slope 511c and the first skirt portion 511d are projected relative to a stand-up portion 51A toward the rear side as viewed in FIG. 11. As illustrated in FIG. 12, an end face a1 of the slope 511c, and an end face b1 of the first skirt portion 511d abut against the left stay 21.

Owing to the aforementioned configuration of the duct 51, the noise generated from a noise source, such as the polygon motor, can be easily confined in the duct 51. As a result, propagation of the noise can be effectively avoided by use of the duct 51, and the copying machine 1 can be kept quiet both during stand-by and in operation.

Although the ducts 31, 41, and 51 cover the image writing device 60 including the polygon motor according to the embodiment of the present invention, the air exhaust device 3 can be used for other devices which generate heat.

Numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No.2000-048058 filed in the Japanese Patent Office on Feb. 24, 2000, and Japanese Patent Application No. 2001-023259 filed in the Japanese Patent Office on Jan. 31, 2001, the entire contents of which are incorporated by reference.

What is claimed as new and is desired to be secured by Letters Patent of the United States is:

1. An air exhaust device for use in an image forming apparatus, comprising:

a duct; and a fan unit arranged in the duct, wherein the duct includes resilient holding means for resiliently holding the fan unit such that vibrations from the fan unit are not transmitted to the image forming apparatus.

2. The air exhaust device according to claim 1, wherein the air exhaust device is arranged in a main body of the image forming apparatus.

3. The air exhaust device according to claim 1, wherein the duct and the resilient holding member are integrally molded from resin material.

4. The air exhaust device according to claim 1, wherein the duct further includes a resilient fixing member configured so as to be pressed against a first member of a main body of the image forming apparatus to position and fix the duct in the main body of the image forming apparatus when the duct is installed in the main body of the image forming apparatus.

5. The air exhaust device according to claim 4, wherein the duct, the resilient holding member, and the resilient fixing member are integrally molded from resin material.

6. The air exhaust device according to claim 4, wherein the duct further includes an attaching member configured to attach the duct to a second member of the main body of the image forming apparatus when the duct is installed in the main body of the image forming apparatus.

7. The air exhaust device according to claim 6, wherein the duct, the resilient holding member, the resilient fixing member, and the attaching member are integrally molded from resin material.

8. The air exhaust device according to claim 1, wherein the duct further includes an attaching member configured to attach the duct to a second member of a main body of the image forming apparatus when the duct is installed in the main body of the image forming apparatus.

9. The air exhaust device according claim 8, to wherein the duct, the resilient holding member, and the attaching member are integrally molded from resin material.

10. The air exhaust device according to claim 1, wherein the duct is attached to a structural assembly of a main body of the image forming apparatus.

11. The air exhaust device according to claim 1, wherein the fan unit includes a harness having a connector attached to one end thereof, and wherein the connector is held by the duct.

12. An air exhaust device for use in an image forming apparatus, comprising:
   a duct integrally molded from resin material and having
      resilient holding means for resiliently holding a fan unit such that vibrations from the fan unit are not transmitted to the image forming apparatus,
      resilient fixing means for resiliently pressing against a first member of a main body of the image forming apparatus, and
      attaching means for attaching the duct to a second member of the main body of the image forming apparatus such that the duct hangs in the main body; and
   a fan unit arranged in the duct and resiliently held by the resilient holding means.

13. The air exhaust device according to claim 12, wherein the duct is attached to a structural assembly of the main body of the image forming apparatus.

14. The air exhaust device according to claim 12, wherein the fan unit includes a harness having a connector attached to one end thereof, and wherein the connector is held by the duct.

15. An image forming apparatus, comprising:
   an image forming having a body;
   an air exhaust device for exhausting air from the body, including:
      a duct; and
      a fan unit arranged in the duct,
      wherein the duct includes resilient holding means for resiliently holding the fan unit such that vibrations from the fan unit are not transmitted to the image forming part.

16. The image forming apparatus according to claim 15, wherein the air exhaust device is arranged in a main body of the image forming apparatus.

17. The image forming apparatus according to claim 15, wherein the duct and the resilient holding member are integrally molded from resin material.

18. The image forming apparatus according to claim 15, wherein the duct further includes a resilient fixing member configured so as to be pressed against a first member of a main body of the image forming apparatus to position and fix the duct in the main body of the image forming apparatus when the duct is installed in the main body of the image forming apparatus.

19. The image forming apparatus according to claim 18, wherein the duct, the resilient holding member, and the resilient fixing member are integrally molded from resin material.

20. The image forming apparatus according to claim 18, wherein the duct further includes an attaching member configured to attach the duct to a second member of the main body of the image forming apparatus when the duct is installed in the main body of the image forming apparatus.

21. The image forming apparatus according to claim 20, wherein the duct, the resilient holding member, the resilient fixing member, and the attaching member are integrally molded from resin material.

22. The image forming apparatus according to claim 15, wherein the duct further includes an attaching member configured to attach the duct to a second member of a main body of the image forming apparatus when the duct is installed in the main body of the image forming apparatus.

23. The image forming apparatus according to claim 22, wherein the duct, the resilient holding member, and the attaching member are integrally molded from resin material.

24. The image forming apparatus according to claim 15, wherein the duct is attached to a structural assembly of a main body of the image forming apparatus.

25. The image forming apparatus according to claim 15, wherein the fan unit includes a harness having a connector attached to one end thereof, and wherein the connector is held by the duct.

26. An image forming apparatus, comprising:
   an image forming having a body;
   an air exhaust device for exhausting air from the body, including:
      a duct having resilient holding means, resilient fixing means and attaching means, integrally molded from resin material; and
      a fan unit arranged in the duct and resiliently held by the resilient holding means such that vibrations from the fan unit are not transmitted to the image forming part,
   wherein the duct is positioned and fixed in a main body of the image forming apparatus with the resilient fixing means pressed against a first member of the main body of the image forming apparatus, and wherein the duct is attached to a second member of the main body of the image forming apparatus with the attaching means.

27. The image forming apparatus according to claim 26, wherein the duct is attached to a structural assembly of the main body of the image forming apparatus.

28. The image forming apparatus according to claim 26, wherein the fan unit includes a harness having a connector attached to one end thereof, and wherein the connector is held by the duct.

29. An air exhaust device for use in an image forming apparatus, comprising:

means for covering a part of the image forming apparatus; and means for exhausting air in the part of the image forming apparatus covered by the covering means, the exhausting means being arranged in the covering means, wherein the covering means includes means for resiliently holding the exhausting means.

30. The air exhaust device according to claim 29, wherein the air exhaust device is arranged in a main body of the image forming apparatus.

31. The air exhaust device according to claim 29, wherein the covering means and the holding means are integrally molded from resin material.

32. The air exhaust device according to claim 29, wherein the covering means further includes means for positioning and fixing the covering means in a main body of the image forming apparatus by being pressed against a first member of the main body of the image forming apparatus.

33. The air exhaust device according to claim 32, wherein the covering means, the holding means, and the positioning/fixing means are integrally molded from resin material.

34. The air exhaust device according to claim 32, wherein the covering means further includes means for attaching the covering means to a second member of the main body of the image forming apparatus.

35. The air exhaust device according to claim 34, wherein the covering means, the holding means, the positioning and fixing means, and the attaching means are integrally molded from resin material.

36. The air exhaust device according to claim 29, wherein the covering means further includes means for attaching the covering means to a second member of a main body of the image forming apparatus.

37. The air exhaust device according to claim 36, wherein the covering means, the holding means, and the attaching means are integrally molded from resin material.

38. The air exhaust device according to claim 29, wherein the covering means is attached to a structural assembly of a main body of the image forming apparatus.

39. The air exhaust device according to claim 29, wherein the exhausting means includes means for electrically connecting the exhausting means to outside, and wherein the connecting means is held by the covering means.

40. An air exhaust device for use in an image forming apparatus, comprising:

means for covering a part of the image forming apparatus; and means for exhausting air in the part of the image forming apparatus covered by the covering means, the exhausting means being arranged in the covering means, wherein the covering means includes means for resiliently holding the exhausting means, means for positioning and fixing the covering means in a main body of the image forming apparatus, and means for attaching the covering means to the main body of the image forming apparatus, integrally molded from resin material, and wherein the covering means is positioned and fixed in the main body of the image forming apparatus with the positioning/fixing means pressed against a first member of the main body of the image forming apparatus, and wherein the covering means is attached to a second member of the main body of the image forming apparatus with the attaching means.

41. The air exhaust device according to claim 40, wherein the covering means is attached to a structural assembly of the main body of the image forming apparatus.

42. The air exhaust device according to claim 40, wherein the exhausting means includes means for electrically connecting the exhausting means to outside, and wherein the connecting means is held by the covering means.

43. A method of making an image forming apparatus, comprising the steps of:

inserting a fan unit into a duct for covering a part of the image forming apparatus;

resiliently holding the fan unit with a resilient holding member of the duct;

pressing a resilient fixing member of the duct against a first member of a main body of the image forming apparatus, and positioning and fixing the duct in the main body of the image forming apparatus; and attaching the duct to a second member of the main body of the image forming apparatus.

* * * * *